(12) United States Patent
Chapman et al.

(10) Patent No.: US 10,177,811 B2
(45) Date of Patent: Jan. 8, 2019

(54) ECHO CANCELLATION

(71) Applicant: CISCO TECHNOLOGY, INC., San Jose, CA (US)

(72) Inventors: John T. Chapman, Coto de Caza, CA (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/666,628

(22) Filed: Aug. 2, 2017

(65) Prior Publication Data

US 2018/0234130 A1    Aug. 16, 2018

Related U.S. Application Data

(60) Provisional application No. 62/457,368, filed on Feb. 10, 2017.

(51) Int. Cl.
*H04L 25/08* (2006.01)
*H04B 3/23* (2006.01)

(52) U.S. Cl.
CPC ..................................... *H04B 3/23* (2013.01)

(58) Field of Classification Search
CPC .... H04L 27/2647; H04B 1/1027; H04B 1/123
USPC .................................. 375/346; 370/392, 286
See application file for complete search history.

(56) References Cited

U.S. PATENT DOCUMENTS

| | | | | |
|---|---|---|---|---|
| 2010/0214145 A1* | 8/2010 | Narasimhan | ........ | H03M 1/1042 341/155 |
| 2011/0200048 A1* | 8/2011 | Thi | .......................... | H04B 3/23 370/392 |
| 2013/0343437 A1* | 12/2013 | Li | ...................... | H04B 7/15585 375/211 |

\* cited by examiner

*Primary Examiner* — Khai Tran
(74) *Attorney, Agent, or Firm* — Merchant & Gould P.C.

(57) ABSTRACT

A method is provided in one example and includes receiving a data signal, receiving an interference signal, wherein the interference signal is copied to create a reference data interference signal, combining the data signal and the interference signal to create a combined signal, using an analog echo cancellation engine on the combined signal to create an analog echo cancellation signal, and using a digital echo cancellation engine on the analog echo cancellation signal to create a data with echo cancellation signal. The data with echo cancellation signal can be communicated using a coaxial cable.

17 Claims, 4 Drawing Sheets

ECHO CANCELLATION

CROSS-REFERENCE TO RELATED APPLICATION

This application claims the benefit of priority under 35 U.S.C. § 119(e) to U.S. Provisional Application Ser. No. 62/457,368, "FULL DUPLEX LUMPED IMPEDANCE MODEL," filed Feb. 10, 2017, which is hereby incorporated by reference in its entirety.

TECHNICAL FIELD

This disclosure relates in general to the field of communications and/or networking and, more particularly, to echo cancellation.

BACKGROUND

End users have more communications choices than ever before. A number of prominent technological trends are currently afoot (e.g., more computing devices, more online video services, more Internet video traffic), and these trends are changing the network delivery landscape. A cable modem termination system (CMTS) is a piece of equipment, typically located in a cable company's headend or hub site, which is used to provide high speed data services, such as cable Internet or Voice over Internet Protocol, to cable subscribers. In order to provide high speed data services, a cable company will connect its headend to the Internet via very high capacity data links to a network service provider. On the subscriber side of the headend, the CMTS enables the communication with subscribers' cable modems. Different CMTSs are capable of serving different cable modem population sizes—ranging from 4,000 cable modems to 150,000 or more, depending in part on traffic. A given headend or hybrid fiber-coaxial (HFC) hub may have between 1-12 CMTSs to service the cable modem population served by that headend or hybrid fiber-coaxial (HFC) hub.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth example embodiments of apparatuses, methods, and systems relating to a system for enabling echo cancellation or at least echo reduction. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof where like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
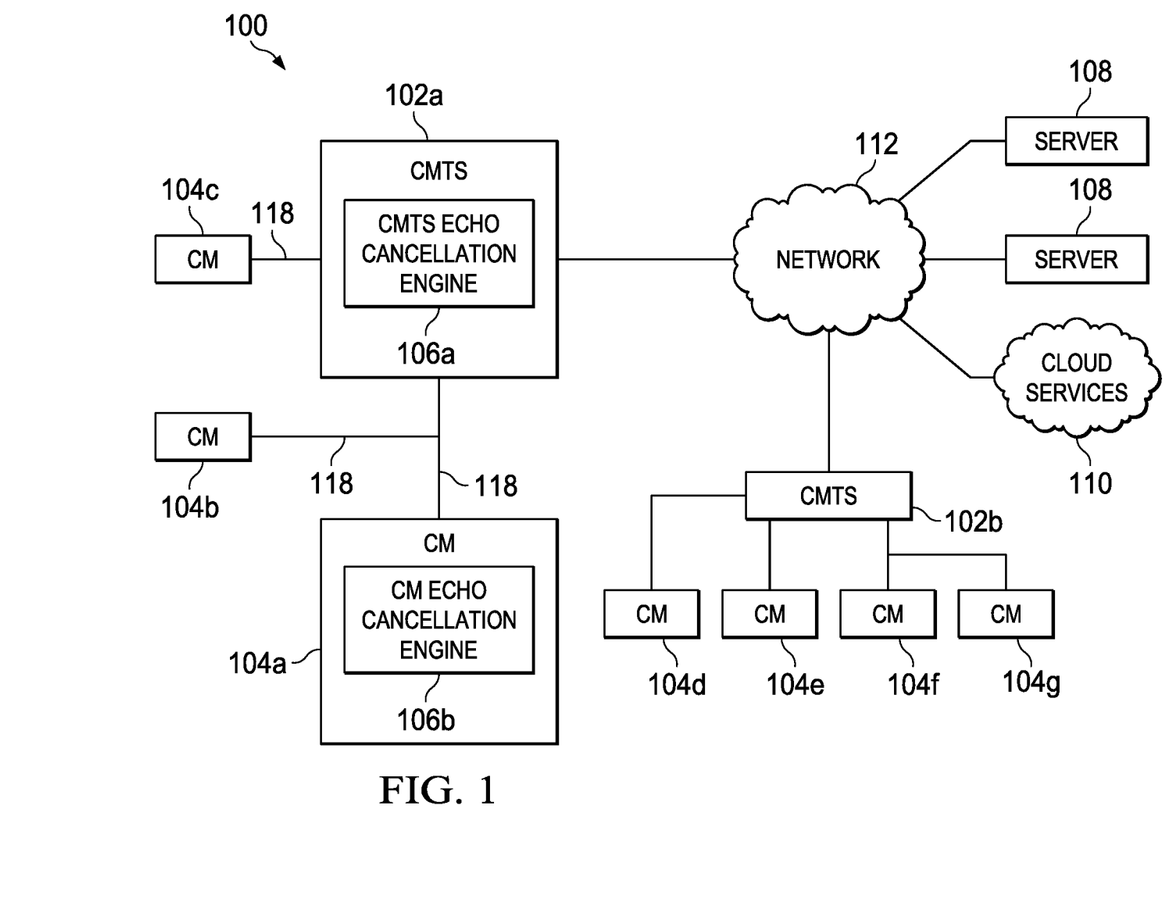
FIG. 1 is a simplified block diagram of a communication system for echo cancellation in accordance with one embodiment of the present disclosure.

FIG. 1 is a simplified block diagram of a communication system 100 to allow for echo cancellation (EC) or at least echo reduction. Communication system 100 can include a plurality of cable modem termination systems (CMTSs) 102a and 102b, a plurality of cable modems (CM) 104a-104g, one or more servers 108, and cloud services 110. Each of CMTSs 102a and 102b, servers 108, and cloud services 110 can be in communication using network 112.

Each CMTS 102a and 102b can include a CMTS EC engine. For example, CMTS 102a is illustrated as including CMTS EC engine 106a. Each CM 104a-104g can include a CM EC engine. For example, CM 104a is illustrated as including CM EC engine 108a.

In an example, CMTS EC engine 106a and CM EC engine 108a can each be configured to allow for EC or at least echo reduction on duplex communications between a CMTS and a CM. CMTS EC engine 106a and CM EC engine 108a can be configured to generate the same echo or interference experienced by a signal but with a 180-degree phase offset so when the offset is added to the signal, the echo or interference is cancelled.

In a specific example, an EC engine can include an input to receive a data signal, an input to receive an interference signal, where the interference signal is copied to create a reference data interference signal, an isolator to combine the data signal and the interference signal to create a combined signal, an analog echo cancellation engine to receive the combined signal and to create an analog echo cancellation signal, and a digital echo cancellation engine to receive the analog echo cancellation signal and to create a data with echo cancellation signal. The data with echo cancellation signal can be communicated from a CMTS to a CM or from a CM to a CMTS using a coaxial cable. In another specific example, an apparatus can include means for receiving a data signal, receiving an interference signal, where the interference signal is copied to create a reference data interference signal, means for combining the data signal and the interference signal to create a combined signal, means for using an analog echo cancellation engine on the combined signal to create an analog echo cancellation signal, and means for using a digital echo cancellation engine on the analog echo cancellation signal to create a data with echo cancellation signal.

For purposes of illustrating certain example techniques of communication system 100, it is important to understand how typical communications may traverse the network. The following foundational information may be viewed as a basis from which the present disclosure may be properly explained.

Networking architectures continue to grow increasingly complex in communication environments. A CMTS is a piece of equipment, typically located in a cable company's headend or hub site, which is used to provide high speed data services, such as cable Internet or Voice over Internet Protocol, to cable subscribers. A CMTS provides many of the same functions provided by the DSLAM in a DSL system. In order to provide high speed data services, a cable company will connect its headend to the Internet via very high capacity data links to a network service provider. On the subscriber side of the headend, the CMTS enables the communication with subscribers' CMs. Different CMTSs are capable of serving different CM population sizes— ranging from 4,000 cable modems to 150,000 or more, depending on CMTS capability. A given headend may have between 1-12 CMTSs to service the CM population served by that headend or HFC hub. The CM is a type of network bridge and modem that provides bi-directional data communication via radio frequency channels on a hybrid fiber-coaxial (HFC) and radio frequency over glass (RFoG) infrastructure.

With respect to an Open Systems Interconnection (OSI) model of network design, a CM is both a Physical Layer (Layer 1) device and a Data Link Layer (Layer 2) forwarder. As an Internet protocol (IP) addressable network node, cable modems support functionality at other layers. Layer 1 is implemented in the Ethernet PHY on its local area network (LAN) interface, and a data over cable service interface specification (DOCSIS) defined cable-specific PHY on its HFC cable interface. The term cable modem refers to this cable-specific PHY. The Network Layer (Layer 3) is implemented as an IP host in that it has its own IP address used by the network operator to maintain the device. In the Transport Layer (Layer 4) the cable modem supports UDP in association with its own IP address, and it supports filtering based on TCP and UDP port numbers to, for example, block forwarding of NetBIOS traffic out of the customer's LAN. In the Application Layer (Layer 7), the cable modem supports certain protocols that are used for management and maintenance, notably Dynamic Host Configuration Protocol (DHCP), SNMP, and TFTP. One issue with the communications between the CMTS and the CM is noise or echo induced by the full duplex operation. In addition, adjacent device can introduce channel interference or their own echo into the system. What is needed is a system to help provide EC between the CMTS and the CM.

A communication system, as outlined in FIG. 1, can resolve these issues (and others). Communication system 100 can be configured to help provide EC or at least echo reduction between the CMTSs and the CMs in communication system 100. Echo is caused by the full duplex nature of transmission when sending and receiving on the same path and reflection occurs. In a full duplex signal, the signal is being sent and received at the same frequency. A signal can be received from the CMTS and a signal can be sent to CMTS. The sent signal will be reflected and overlay with the received signal and cause interference. Hence, the coupling portion needs to be cancelled out from the received signal.

In an example, communication system 100 can be configured to create a 180-degree offset of the interference signal. Each of CMTS EC engine 106a and CM EC engine 106b can be used to determine the amount of echo or interference and that amount of echo or interference can be used to create a 180-degree signal that will be used to cancel out the echo or interference. In addition, adjacent channel interference can be reduced with filtering and/or analog EC.

Turning to the infrastructure of FIG. 1, communication system 100 in accordance with an example embodiment is shown. Generally, communication system 100 can be implemented in any type or topology of networks. Network 112 represents a series of points or nodes of interconnected communication paths for receiving and transmitting packets of information that propagate through communication system 100. Network 112 offers a communicative interface between nodes, and may be configured as any LAN, virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 112 can include any number of hardware or software elements coupled to (and in communication with) each other through a communications medium.

In communication system 100, network traffic, which is inclusive of packets, frames, signals, data, etc., can be sent and received according to any suitable communication messaging protocols. Suitable communication messaging protocols can include a multi-layered scheme such as OSI model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, CMTS 102a and 102b, CMs 104a-104e, servers 108 and cloud services 110 are meant to encompass network elements, network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

As used herein in this Specification, the term 'network element' is meant to encompass any of the aforementioned elements, as well as servers (physical or virtually implemented on physical hardware), machines (physical or virtually implemented on physical hardware), end-user devices, routers, switches, cable boxes, gateways, bridges, load-balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for determining analytics related to a network.

In one implementation, network elements implementing the EC or at least echo reduction features described herein may include software to achieve (or to foster) the functions discussed herein for providing and processing when the software is executed on one or more processors to carry out the functions. This could include the implementation of instances of modules (e.g., CMTS EC engine 106a, CM EC engine 106b, analog EC engine 128 (illustrated in FIG. 3), digital EC engine 134 (illustrated in FIG. 3)) and/or any other suitable element that would foster the activities discussed herein. Additionally, each of these elements can have an internal structure (e.g., a processor, a memory element, etc.) to facilitate some of the operations described herein. In other embodiments, these functions for EC or at least echo reduction may be executed externally to these elements, or included in some other network element to achieve the intended functionality. Alternatively, network elements may include software (or reciprocating software) that can coordinate with other network elements in order to achieve determination of analytics related to a network described herein. In still other embodiments, one or several devices may include any suitable algorithms, hardware, software, components, modules, interfaces, or objects that facilitate the operations thereof.

In regards to the internal structure associated with communication system 100, CMTS 102a and 102b and CMs 104a-104e can each include memory elements for storing information to be used in the operations outlined herein. Each of CMTS 102a and 102b, CMs 104a-104e, servers 108 and cloud services 110 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the EC or at least echo reduction functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an EEPROM) or an ASIC that includes digital logic, software, code, electronic instructions, or any suitable combination thereof.

Any of these elements (e.g., the network elements, etc.) can include memory elements for storing information to be used in achieving the EC or at least echo reduction functions, as outlined herein. Additionally, each of these devices may include a processor that can execute software or an algorithm to perform the functions of EC or at least echo reduction as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In an example implementation, network elements of communication system 100 may include software modules (e.g., CMTS EC engine 106a, CM EC engine 106b, analog EC engine 128 (illustrated in FIG. 3), digital EC engine 134 (illustrated in FIG. 3)) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, CMTS 102a and 102b and CMs 104a-104e each may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a FPGA, an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Servers 108 can be a network element such as a physical server or virtual server and can be associated with clients, customers, endpoints, or end users wishing to initiate a communication in communication system 100 via some network (e.g., network 112). The term 'server' is inclusive of devices used to serve the requests of clients and/or perform some computational task on behalf of clients within communication systems 100. Cloud services 110 may generally be defined as the use of computing resources that are delivered as a service over a network, such as the Internet. The services may be distributed and separated to provide required support for electronic devices. Typically, compute, storage, and network resources are offered in a cloud infrastructure, effectively shifting the workload from a local network to the cloud network.

Figure 2:
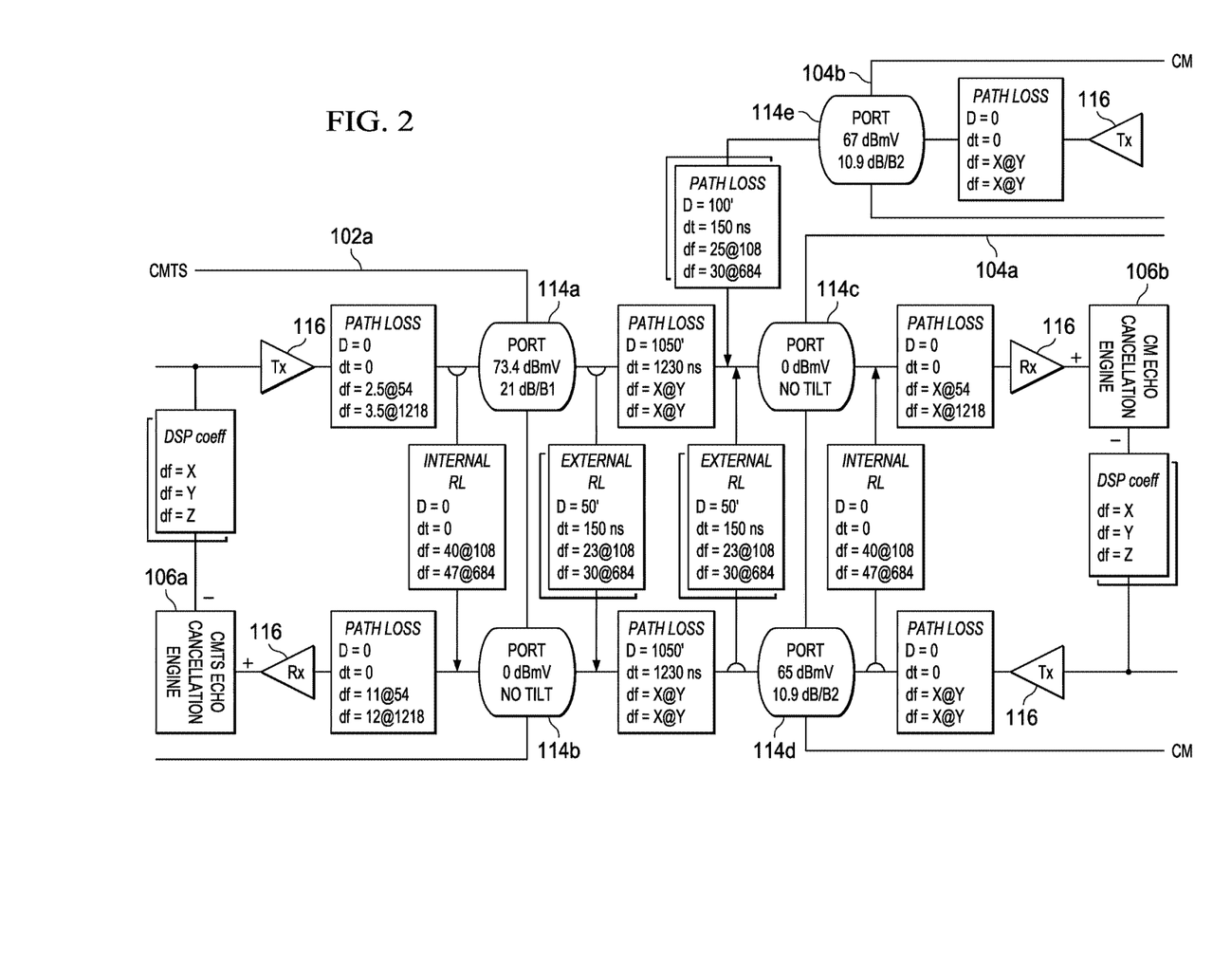
FIG. 2 is a simplified block diagram illustrating example details of a communication system for echo cancellation in accordance with one embodiment of the present disclosure.

Turning to FIG. 2, FIG. 2 is a simplified block diagram of a portion of communication system 100 for use in a communication system to allow for EC or at least echo reduction in accordance with one embodiment of the present disclosure. CMTS 102a can include CMTS EC engine 106a, ports 114a and 114b, and amplifiers 116. CM 104a can include CM EC engine 106b, ports 114c and 114d, and amplifiers 116. FIG. 2 illustrates example details of path loss, external inductance and resistance (RL), and internal RL. CMTS EC engine 106a and CM EC engine 106b can each be configured to help provide EC or at least echo reduction between CMTS 102a and CM 104a.

In a specific example, an orthogonal frequency division multiplexing (OFDM) channel is 192 MHz downstream (DS) and 96 MHz upstream (US). The EC can be implemented for every 96 MHz US channel. OFDM is a particular form of multi-carrier transmission and is suited for frequency selective channels and high data rates. This technique transforms a frequency-selective wide-band channel into a group of non-selective narrowband channels, which makes it robust against large delay spreads by preserving orthogonality in the frequency domain. OFDM is a combination of modulation and multiplexing. Multiplexing generally refers to independent signals, those produced by different sources. In OFDM, independent signals are a sub-set of one main signal as the signal itself is first split into independent channels, modulated by data, and then re-multiplexed to create the OFDM signal. OFDMA is a multi-user version of OFDM. Multiple access is achieved in OFDMA by assigning subsets of subcarriers to individual users. This allows simultaneous low-data-rate transmission from several users. CMTS EC engine 106a and CM EC engine 106b can be configured to suppress co-channel interference (CCI).

Figure 3:
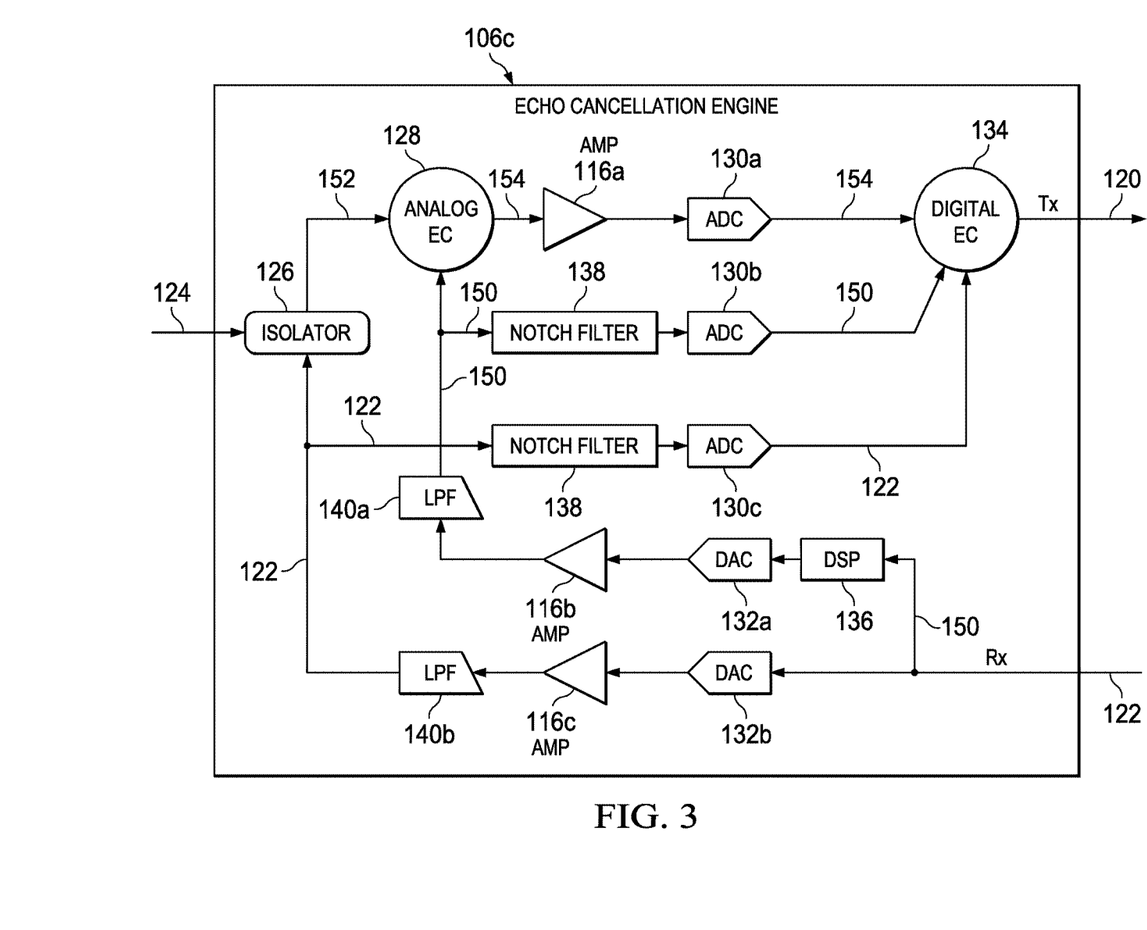
FIG. 3 is a simplified block diagram illustrating example details associated with a portion of a communication system for echo cancellation in accordance with one embodiment of the present disclosure.

Turning to FIG. 3, FIG. 3 is a simplified block diagram illustrating example details associated with an EC engine 106c for use in a communication system in accordance with one embodiment of the present disclosure. EC engine 106c can include a plurality of amplifiers 116a-116c, an isolator 126, an analog EC engine 128, a plurality of analog to digital converters (ADC) 130a-130c, a plurality of digital to analog converters (DAC) 132a and 132b, a digital EC engine 134, a digital signal processor (DSP) 136, a plurality of notch filters 138, and a plurality of low pass filters (LPF) 140a and 140b.

Data with EC signal 120 is the data signal that includes EC. Data with EC signal 120 can be a content with EC signal that includes content generated or requested by a user or customer. Interference signal 122 includes any echoes, interference, or other distortions coupled to the downstream signal. Data signal 124 is a data signal without EC. In an example, data signal 124 can be from or to a CMTS delivered on a coax connection. Reference data interference signal 150 is a reference signal that can be used to help create the EC included in data with EC signal 120. Combined signal 152 is a signal that includes interference signal 122 and data signal 124 after interference signal 122 and data signal 124 have passed through isolator 126. Analog EC signal 154 is the result of analog EC on combined signal 152.

DSP 136 can be configured to create a 180-degree offset of interference signal 122. This can be used to determine the amount of echo or interference and that amount of echo or interference can be used to create a 180-degree signal that will be used to cancel out the echo or interference. Reference data interference signal 150 can be an analog reference signal for analog EC engine 128. Interference signal 122 can be a digital reference signal for digital EC engine 134. Reference data interference signal 150 going to digital EC engine 134 can be used to cancel out the noise from amplifier 116b and analog EC engine 128.

Data signal 124 can be from a coax cable connection (e.g., either to a CM from a CMTS or to a CMTS from a CM). Isolator 126 can be configured to separate out the signal needed to be sent analog EC engine 128. In a specific example, isolator 126 can be configured to converge a four-wire connection into a two-wire connection and separate out the signal needed to be sent to analog EC engine 128. Any coupling from interference signal 122 and data signal 124 and any reflection from data signal 124 can be determined by analog EC engine 128 when compared to reference data interference signal 150.

Digital EC engine 134 does a digital EC on analog EC signal 154 after analog EC signal 154 passed through analog to digital converter 130a. Interference signal 122 can be used by digital EC engine 134 to help cancel out the noise due to analog EC engine 128 and amplifier 116a in analog EC signal 154. Analog EC engine 128 can be configured to cancel at least a portion of the echo in the signal. The signal includes received data signal 124 combined with interference signal 122. To help to cancel out coupled interference, reference data interference signal 150 can be used by analog EC.

Figure 4:
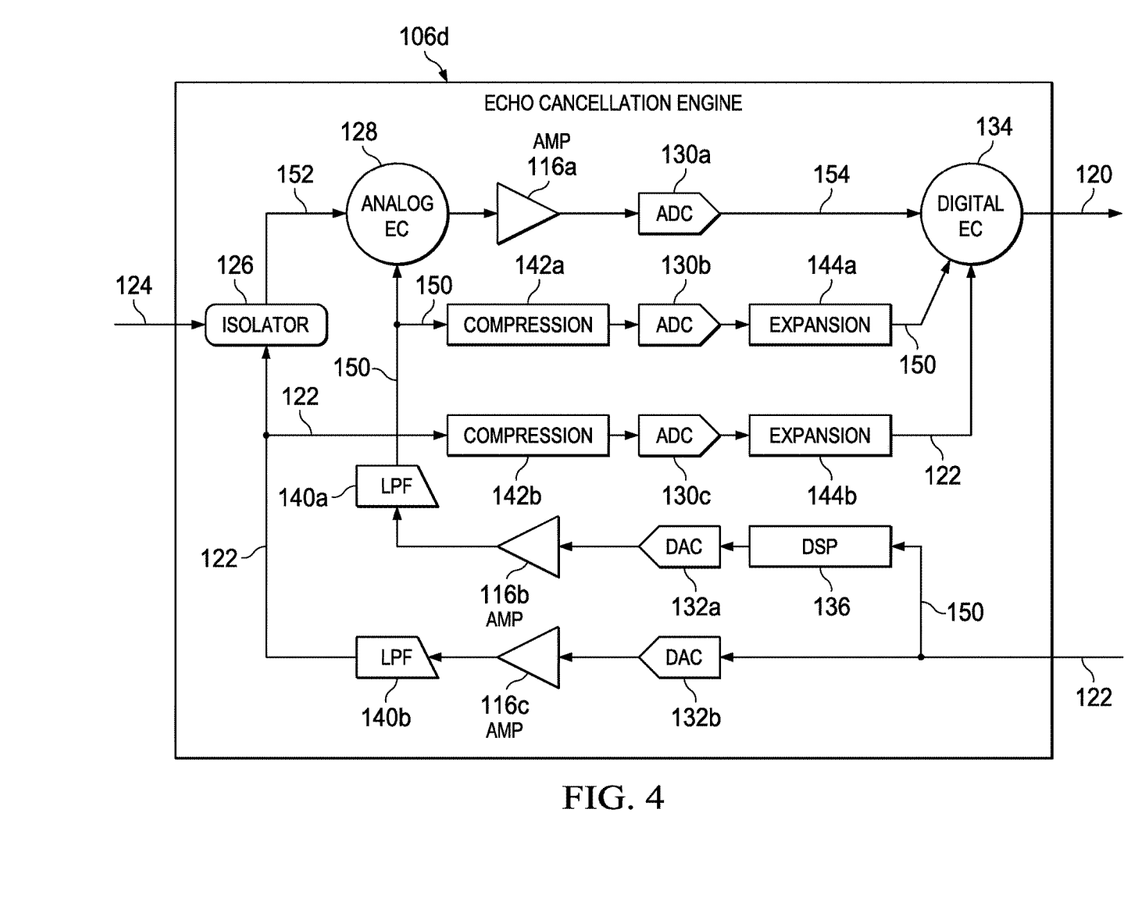
FIG. 4 is a simplified block diagram illustrating example details associated with a portion of a communication system for echo cancellation in accordance with one embodiment of the present disclosure.

Turning to FIG. 4, FIG. 4 is a simplified block diagram illustrating example details associated with an EC engine 106c for use in a communication system in accordance with one embodiment of the present disclosure. EC engine 106d can include plurality of amplifiers 116a-116c, isolator 126, analog EC engine 128, plurality of ADCs 130a-130c, plurality of DACs 132a and 132b, a digital EC engine 134, DSP 136, plurality of LPF 140a and 140b, compression engines 142a and 142b, and expansion engines 144a and 144b.

Compression engines 142a and 142b and expansion engines 144a and 144b can be used in systems that use companding. For example, if communication system includes full duplex DOCSIS (FDX DOCSIS). In telecommunication and signal processing, companding (occasionally called compansion) is a method of mitigating the detrimental effects of a channel with limited dynamic range. The name is a combination of the words compressing and expanding. The use of companding allows signals with a large dynamic range to be transmitted over facilities that have a smaller dynamic range capability. Compression can cause distortion and this distortion can be accounted for by digital EC engine 134. If EC engine 106c or 106d is used in a CMTS, the bandwidth of EC engine 106c or 106d may be wider than EC engine 106c or 106d in CM.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, communication system 100 may be applicable to other protocols and arrangements. In addition, although communication system 100 has been illustrated with reference to particular elements and operations that facilitate the communication process, these elements and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a data signal;
   receiving an interference signal, wherein the interference signal is copied to create a reference data interference signal;
   combining the data signal and the interference signal to create a combined signal wherein an isolator combines the data signal and the interference signal to create the combined signal;
   using an analog echo cancellation engine on the combined signal to create an analog echo cancellation signal; and
   using a digital echo cancellation engine on the analog echo cancellation signal to create a data with echo cancellation signal.

2. The method of claim 1, wherein the data with echo cancellation signal is communicated to a cable modem using a coaxial cable.

3. The method of claim 2, wherein the data with echo cancellation signal is communicated to a cable modem termination system using a coaxial cable.

4. The method of claim 1, wherein a digital signal processor creates a 180-degree offset of the reference data interference signal before the reference data interference signal is used by the analog echo cancellation engine.

5. The method of claim 1, wherein the digital echo cancellation engine uses the interference signal, the reference data interference signal, and the analog echo cancellation signal to create the data with echo cancellation signal.

6. The method of claim 5, wherein the interference signal and the reference data interference signal each pass through a notch filter and an analog to digital converter before being used by the digital echo cancellation engine.

7. The method of claim 1, wherein the interference signal and the reference data interference signal each pass through a digital to analog converter and a low pass filter before being used by the analog echo cancellation engine.

8. An echo cancellation engine, wherein the echo cancellation engine comprises:
   an input to receive a data signal;
   an input to receive an interference signal, wherein the interference signal is copied to create a reference data interference signal;
   an isolator to combine the data signal and the interference signal to create a combined signal;
   an analog echo cancellation engine to receive the combined signal and to create an analog echo cancellation signal;
   a digital echo cancellation engine to receive the analog echo cancellation signal and to create a data with echo cancellation signal; and
   a digital signal processor to create a 180-degree offset of the reference data interference signal before the reference data interference signal is used by the analog echo cancellation engine.

9. The echo cancellation engine of claim 8, wherein the data with echo cancellation signal is communicated to a cable modem using a coaxial cable.

10. The echo cancellation engine of claim 9, wherein the data with echo cancellation signal is communicated to a cable modem termination system using a coaxial cable.

11. The echo cancellation engine of claim 9, wherein the digital echo cancellation engine uses the interference signal, the reference data interference signal, and the analog echo cancellation signal to create the data with echo cancellation signal.

12. The echo cancellation engine of claim 9, wherein the interference signal and the reference data interference signal each pass through a notch filter and an analog to digital converter before being used by the digital echo cancellation engine.

13. The echo cancellation engine of claim 9, wherein the interference signal and the reference data interference signal each pass through a digital to analog converter and a low pass filter before being used by the analog echo cancellation engine.

14. An electronic device, comprising:
a memory element configured to store data,
a processor operable to execute instructions associated with the data, and
an echo cancellation engine configured for:
receiving a data signal;
receiving an interference signal, wherein the interference signal is copied to create a reference data interference signal;
combining the data signal and the interference signal to create a combined signal;
using an analog echo cancellation engine on the combined signal to create an analog echo cancellation signal; and
using a digital echo cancellation engine on the interference signal, the reference data interference signal, and the analog echo cancellation signal to create a data with echo cancellation signal.

15. The electronic device of claim 14, wherein the data with echo cancellation signal is communicated to a cable modem using a coaxial cable.

16. The electronic device of claim 15, wherein the data with echo cancellation signal is communicated to a cable modem termination system using a coaxial cable.

17. The electronic device of claim 14, wherein a digital signal processor creates a 180-degree offset of the reference data interference signal before the reference data interference signal is used by the analog echo cancellation engine.

* * * * *